United States Patent [19]

Tokunaga et al.

[11] 4,306,138

[45] Dec. 15, 1981

[54] POWER SUPPLY APPARATUS FOR RESISTANCE WELDER INCLUDING MEANS FOR PREVENTING POLARIZED TRANSFORMER EXCITATION

[75] Inventors: Norikazu Tokunaga; Hisao Amano; Yorito Jifuku, all of Hitachi, Japan

[73] Assignee: Hitachi, Ltd., Tokyo, Japan

[21] Appl. No.: 42,067

[22] Filed: May 24, 1979

[30] Foreign Application Priority Data

May 29, 1978 [JP] Japan .................. 53-63260
May 29, 1978 [JP] Japan .................. 53-63261

[51] Int. Cl.³ .............................. B23K 11/24
[52] U.S. Cl. ..................... 219/114; 219/110; 323/244
[58] Field of Search ............ 219/108, 110, 114; 323/220 SC, 24

[56] References Cited

U.S. PATENT DOCUMENTS

| | | | |
|---|---|---|---|
| 3,691,452 | 9/1972 | Aguiar | 323/24 |
| 3,693,069 | 9/1972 | Kelley, Jr. et al. | 323/24 |
| 3,932,725 | 1/1976 | Ganowski | 219/110 |
| 3,935,530 | 1/1976 | Tanaka et al. | 219/108 |
| 4,076,974 | 2/1978 | Gee | 219/114 |
| 4,104,724 | 8/1978 | Dix et al. | 219/108 |

*Primary Examiner*—C. C. Shaw
*Attorney, Agent, or Firm*—Craig and Antonelli

[57] ABSTRACT

A power supply apparatus for a resistance welder has an inverse-parallel thyristor circuit for controlling the welding current. One of thyristors connected in inverse-parallel relationship is turned on by a first signal whose reference phase is established by a synchronizing signal which is based on a voltage wave form of an AC power source and the other thyristor is turned on by a second signal whose reference phase is established by a signal which is delayed half a period of the voltage wave form with respect to the first signal, so that integrals of positive and negative halves of the output voltage wave form of the inverse parallel thyristor circuit can always be made equal.

7 Claims, 8 Drawing Figures

POWER SUPPLY APPARATUS FOR RESISTANCE WELDER INCLUDING MEANS FOR PREVENTING POLARIZED TRANSFORMER EXCITATION

BACKGROUND OF THE INVENTION

This invention relates to a power supply apparatus for a resistance welder which as a current controlling function suitably adaptive to a resistance welder.

In power supply apparatus for resistance welders, the value of an AC voltage applied across the welding electrodes is varied by controlling the conducting periods of gate controlled rectifiers (hereinafter referred to as thyristors) connected in inverse-parallel relationship, in order to control the welding current flowing through a workpiece. However, when the thyristors are ignited or turned on and the welding current is conducted, a voltage drop develops across the impedance of the power source, causing the voltage wave form to distort with the result that the difference between the phases for turning on the two thyristors is deviated from the normal phase difference which is 180°. Especially, when a great number of power supply apparatus for resistance welders are loaded, the deviation of the phase difference grows large.

In the event that the difference between phases for turning on the two thyristors is deviated from the 180° normal phase difference, integrals of positive and negative halves of the voltage wave form become asymmetrical and hence the transformer core is subject to a polarized excitation. As a result, an overcurrent flows through the transformer to burn the same or break down the thyristors, also resulting in a defect that the welding current cannot reach a set value, leading to welding failures.

SUMMARY OF THE INVENTION

An object of the present invention is to provide a power supply apparatus for a resistance welder wherein the integrals of positive and negative halves of the output voltage wave form of an inverse-parallel connection thyristor circuit can always be made equal even when a phase shift is caused in the power source voltage due to distortion of the power source voltage waveform. To this end, according to this invention, one of the thyristors connected in inverse-parallel relationship is turned on by a first signal whose reference phase is established by a synchronizing signal which is based on a voltage wave form of an AC power source whereas the other thyristor is turned on by a second signal whose reference phase is established by a signal delayed half a period of the voltage wave form with respect to the first signal.

Another object of this invention is to automatically correct different integrals of positive and negative halves of the output voltage wave form of the inverse-parallel connection thyristor circuit in the power supply apparatus of the type described to be equal, when these integral values become different from each other due to a change in value of the power source voltage caused by a change in the load in the system. To this end, according to this invention, the power supply apparatus is provided with means for sensing a deviation between positive and negative halves of the output current of the inverse-parallel connection thyristor circuit to produce a current deviation signal by which the signal delayed half the period is corrected, and a third signal (a new second signal) is produced, whose reference phase is established by the corrected signal, for turning on the above-mentioned other thyristor.

Still another object of this invention is to provide a power supply apparatus for a resistance welder wherein the automatic correction can be effected more accurately by varying the transform characteristic of the current deviation signal in accordance with values of the controlling angle of the inverse-parallel thyristors.

Still another object of this invention is to provide a power supply apparatus for a resistance welder wherein a deviation of the welding current from a set value can be corrected automatically by additionally providing a constant current function.

DESCRIPTION OF THE PREFERRED EMBODIMENTS

Figure 1:
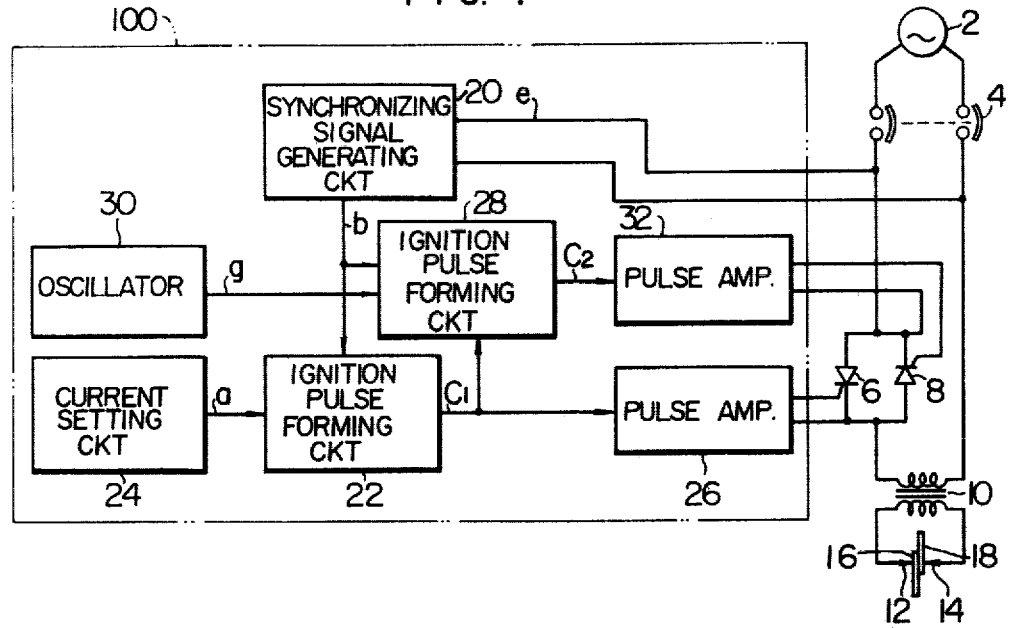
FIG. 1 is a block diagram showing an embodiment of the invention.

Referring to FIG. 1, thyristors 6 and 8 connected in inverse-parallel relationship are connected to receive AC power from an AC power source 2 via a circuit breaker 4. The inverse-parallel thyristors 6 and 8 supply a given AC current to welding electrodes 12 and 14 via a transformer 10 to thereby weld workpieces 16 and 18.

Figure 3:
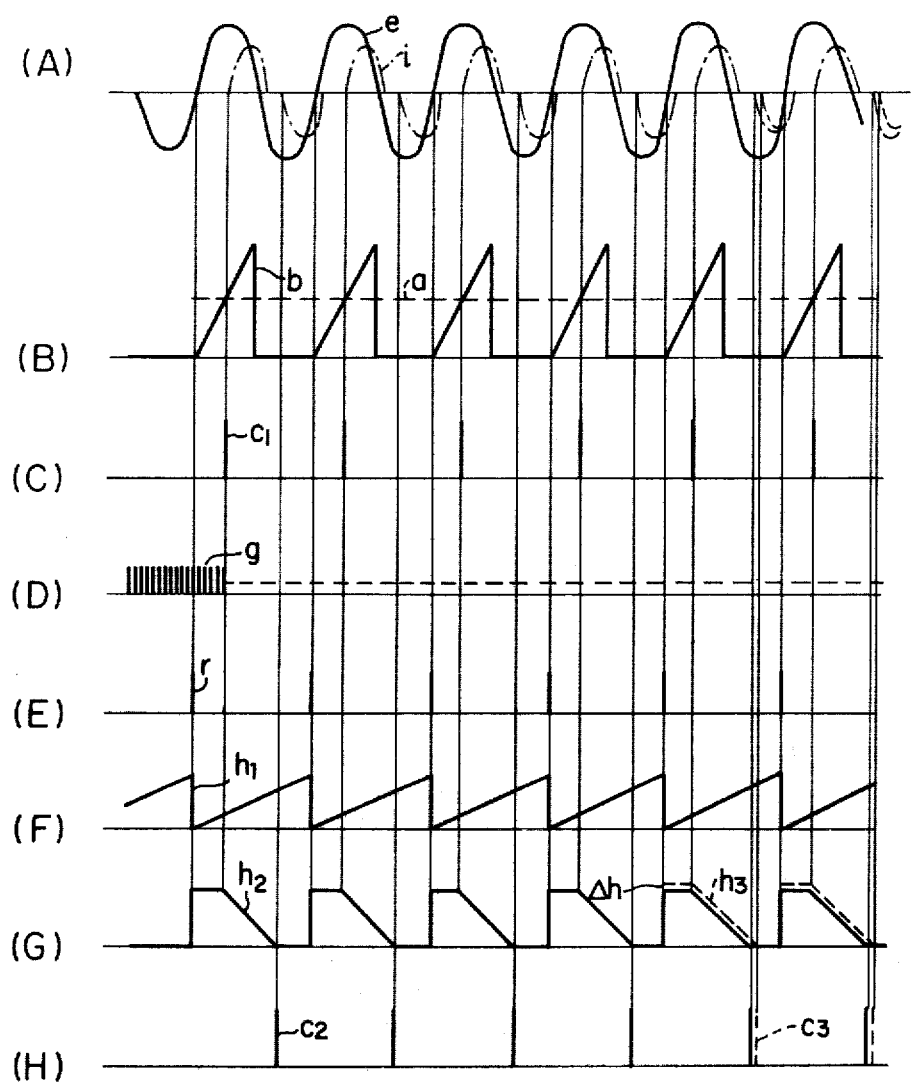
FIG. 3 is a wave-form diagram of outputs appearing in components of FIGS. 1 and 2.

A gate controlling circuit generally designated at 100 operates to supply ignition pulses to the thyristors 6 and 8 as follows. A synchronizing signal generating circuit 20 first generates a synchronizing pulse b as shown in FIG. 3 at (B) based on a voltage wave form e of AC power source 2 as shown in FIG. 3 at (A). An ignition pulse forming circuit 22 is connected to receive the synchronizing signal b and a level setting signal a as shown in FIG. 3 at (B) sent from a current setting circuit 24, and produces an ignition pulse $C_1$ as shown in FIG. 3 at (C) when the synchronizing signal b reaches the level setting signal a. The ignition pulse C1 is fed to the thyristor 6 via a pulse amplifier 26.

On the other hand, an ignition pulse forming circuit 28 is connected to receive the synchronizing signal b, the ignition pulse $C_1$ and a clock signal g as shown in FIG. 3 at (D) generated from an oscillator 30 and operates, in a manner to be described later, to produce an ignition pulse $C_2$ as shown in FIG. 3 at (H). This ignition pulse $C_2$ is fed to the thyristor 8 via a pulse amplifier 32.

Figure 2:
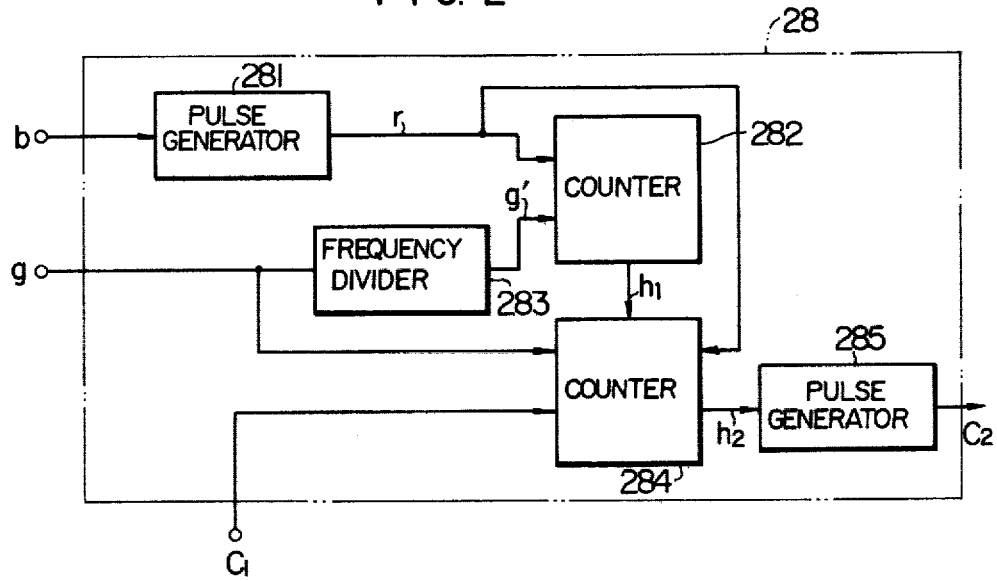
FIG. 2 is a block diagram showing in detail an ignition pulse forming circuit 28 in FIG. 1.

Reference is now made to FIG. 2, where there is shown the manner for producing the ignition pulse $C_2$ by means of the ignition pulse forming circuit 28. A pulse generator 281 receives the synchronizing signal b and produces a pulse r as shown in FIG. 3 at (E) at the time the synchronizing signal b rises. Then, a counter 282 begins to count up a signal g' generated from a frequency divider 283 which divides the clock signal g, and is reset by the trailing edge of the output pulse r from the pulse generator 281. In other words, the counter 282 counts up the signal g' until it receives a subsequent pulse r, and delivers an accumulated output $h_1$ as shown in FIG. 3 at (F).

A counter 284 on the other hand, is set with the count of the counter 282 at the leading edge of pulse r and begins to count down the set count, when receiving the ignition pulse $C_1$, in synchronism with the clock signal g to thereby deliver a signal $h_2$ as shown in FIG. 3 at (G). At a time the count of the counter 284 falls to zero, that is, at a time which is exactly delayed half a period of the voltage wave form e with respect to the generation of the ignition pulse $C_1$, a pulse generator 285 produces an ignition pulse $C_2$. The thyristors 6 and 8 respectively receiving the ignition pulses $C_1$ and $C_2$ in this manner supply a voltage of equal positive and negative halves to the welding transformer. Thus, according to this embodiment, it is possible to prevent a polarized excitation of the transformer due to a phase shift in the power source voltage caused by a waveform distortion. However, this embodiment does not include a counter measure for preventing a polarized excitation due to a change in value of the power source voltage caused by a change in the load in the system.

Figure 4:
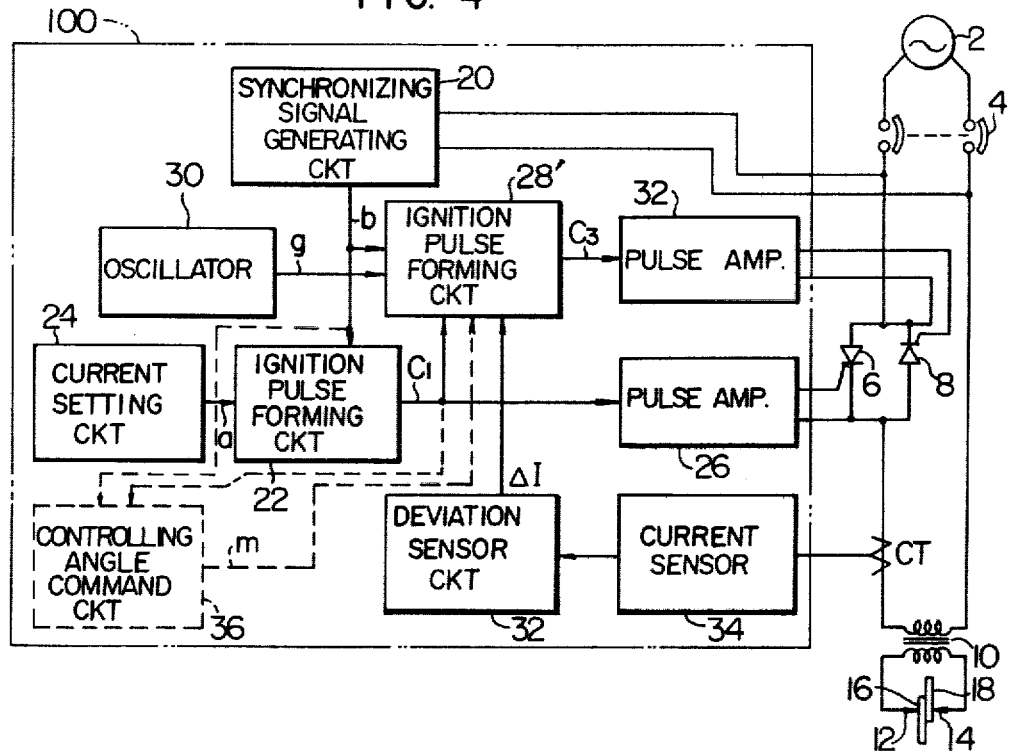
FIG. 4 is a block diagram of another embodiment of the invention.

Another embodiment of the invention is shown in FIG. 4, which is provided, in addition to the function of the previous embodiment, with a function to sense a deviation between positive and negative halves of the current, whereby the phases of the ignition pulses supplied to thyristors 6 and 8 are so controlled as to cancel the deviation. This embodiment can prevent a polarized excitation of the transformer due to a change in value of the power source voltage. In FIG. 4, the same reference numerals designate the same components as those in FIG. 1. This embodiment additionally comprises a current sensor 34, a deviation sensor circuit 32 and a controlling angle command circuit 36. Characters $\Delta I$ and m designate a current deviation signal and a phase characteristic signal, respectively. Operation of this embodiment is generally identical to that of the previous embodiment of FIG. 1, except that it relies on an ignition pulse forming circuit 28' which will be described below.

Figure 5:
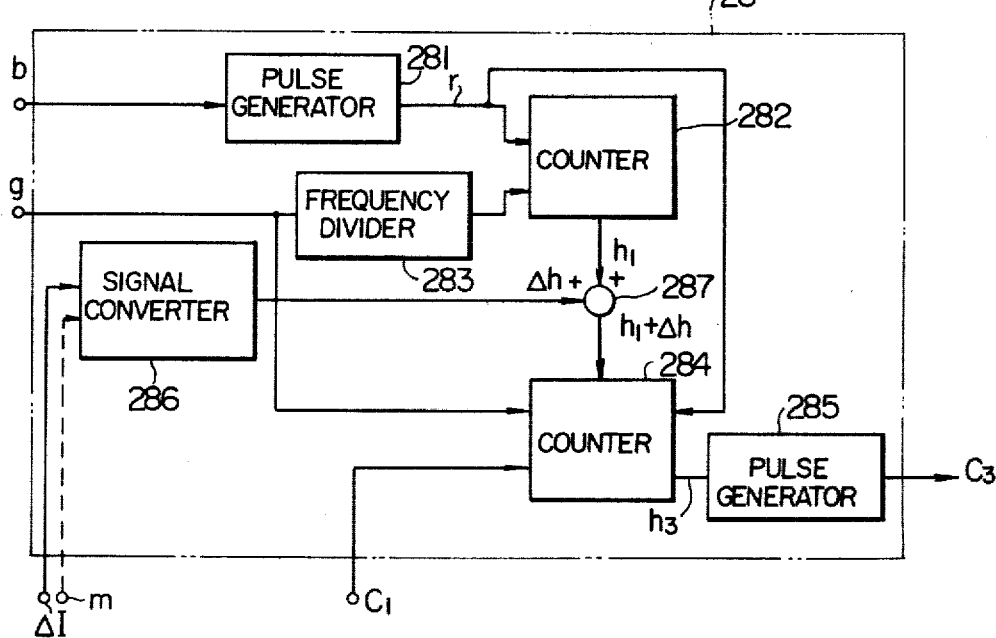
FIG. 5 is a block diagram showing in detail an ignition pulse forming circuit 28' in FIG. 4.

The ignition pulse forming circuit 28' for generating an ignition pulse $C_3$ is shown in block form in FIG. 5 in which the same components as those in FIG. 2 are designated by the same reference numerals. As shown, the ignition pulse forming circuit 28' additionally comprises a signal converter 286 and an adder 287. Signal wave forms $h_3$ and $C_3$ specifically related to FIG. 5 are illustrated in FIG. 3 at dotted lines.

The ignition pulse forming circuit 28' is different from the ignition pulse forming circuit 28 in FIG. 2 in that a counter 284 receives a correction signal $\Delta h$ which is based on a current deviation signal $\Delta I$, along with an output $h_1$ from a counter 282. Accordingly, the counter 284 delivers the signal $h_3$ which produces a shifting of the initial count of counter 284 by $\Delta h$. The counter 284 then counts down from a set value subject to the shift of $\Delta h$, and the ignition pulse $C_3$ is produced when the count of the counter 284 falls to zero. This embodiment can provide current free from the deviation between its positive and negative halves so that the polarized exitation of the transformer can be prevented effectively even when halves of a phase shift is caused in the power ource voltage due to its waveform distortion and when the value of the power source voltage is changed due to a change in the load of the system.

Figure 6:
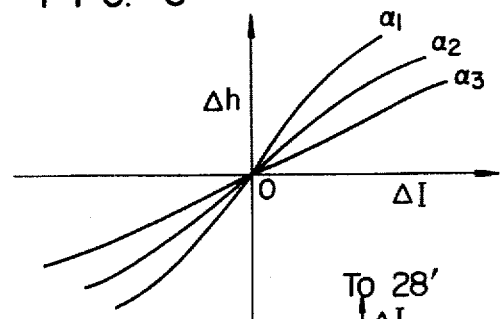
FIG. 6 is a graph showing the transform characteristic of a signal converter 286 in FIG. 5.

The above embodiments have been described on the assumption that a transform characteristic $\Delta I/\Delta o$ of the signal converter 286 is constant. However, the transform characteristic $\Delta I/\Delta H$ of the signal converter 286 may be varied in accordance with the controlling angle $\alpha$ of the thyristor by means of the controlling angle command circuit 36. With this arrangement, it is possible to extend the controlling range while maintaining stability of the welding current. The transform characteristic $\Delta I/\Delta h$ varies as shown in FIG. 6, for example, and is selected by the output signal m from the controlling angle command circuit 36 which depends on controlling angle $\alpha_1$, $\alpha_2$ or $\alpha_3$ representative of the phase difference between the synchronizing signal b and the ignition pulse $C_1$.

Figure 7:
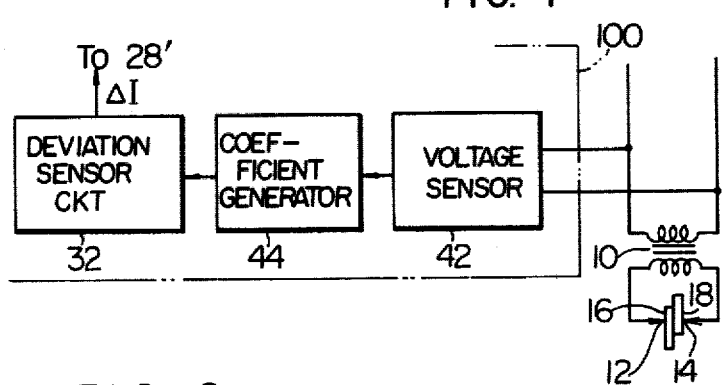
FIG. 7 is a block diagram of an arrangement for obtaining the input to a deviation sensing circuit by using a voltage sensor and a coefficient generator in combination in place of a current sensor.

In FIG. 4, the current sensor 34 picks up the current and the deviation sensor circuit 32 then produces the current deviation $\Delta I$. Alternatively, as shown in FIG. 7, a voltage sensor 42 may be employed for picking up the voltage the value of which is then converted into a current value at a coefficient generator 44. The deviation sensor circuit 32 receives this current value to produce the current deviation $\Delta I$.

Figure 8:
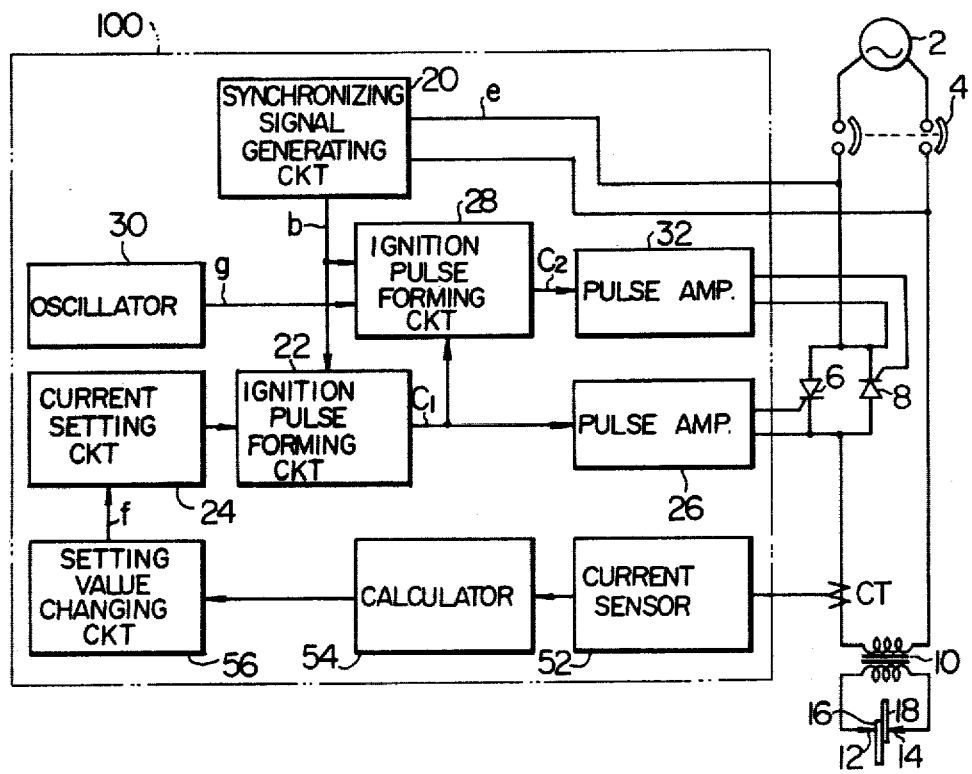
FIG. 8 is a block diagram showing a modification wherein the embodiment of FIG. 1 is additionally provided with a constant current function.

Still another embodiment shown in FIG. 8 is provided with a constant current function. In this embodiment, the level of the output signal a from the current setting circuit 24 in FIG. 1 or 4 is varied as described below.

As shown in FIG. 8, this embodiment comprises, in addition to the components in FIG. 1, a current sensor 52, a calculator 54, and a setting value changing circuit 56. The calculator 54 computes the effective value of a sensed current over predetermined cycles. The setting value changing circuit 56 generates, based on the effective value, a signal f which brings the welding current to the set value. The current setting circuit 24 receives the signal f and, in accordance therewith, increases or decreases the level of the output signal a. Consequently, according to this embodiment, the welding current can automatically be corrected even when deviated from the set value.

What is claimed is:

1. A power supply apparatus for a resistance welder comprising:
   first and second gate controlled rectifiers connected in inverse-parallel relationship and inserted between an AC power source and a transformer for supplying, during a predetermined time interval, a welding current from the AC power source to a pair of welding electrodes via the transformer;
   a synchronizing signal generating circuit for generating a synchronizing signal based on the voltage wave form of said AC power source;
   a first ignition pulse forming circuit responsive to said synchronizing signal and a setting level, for supplying a first ignition pulse to said first gate controlled rectifier when said synchronizing signal reaches the setting level; and
   a second ignition pulse forming circuit responsive to said synchronizing signal and said first ignition pulse for supplying to said second gate controlled rectifier a second ignition pulse whose phase is delayed by half a period of the voltage wave form with respect to the phase of said first ignition pulse based on the time of generation of said first ignition pulse.

2. A power supply apparatus for a resistance welder according to claim 1, wherein said second ignition pulse forming circuit comprises:
- a pulse generator connected to receive said synchronizing signal and producing a pulse at the time said synchronizing signal rises;
- a first counter connected to receive a predetermined clock pulse for counting up the same and being reset at the trailing edge of said pulse from said pulse generator; and
- a second counter being set with the accumulated count in said first counter at the leading edge of said pulse from said pulse generator for counting down the set count with the predetermined clock pulse each time it receives the first ignition pulse to produce said second ignition pulse when its count falls to zero.

3. A power supply apparatus for a resistance welder comprising:
- first and second gate controlled rectifiers connected in inverse-parallel relationship and inserted between an AC power source and a transformer for supplying, during a predetermined time interval, a welding current from the AC power source to a pair of welding electrodes via the transformer;
- a synchronizing signal generating circuit for generating a synchronizing signal based on the voltage wave form of said AC power source;
- a first ignition pulse forming circuit responsive to said synchronizing signal and a setting level, for supplying a first ignition pulse to said first gate controlled rectifier when said synchronizing signal reaches said setting level;
- a current deviation sensor circuit responsive to the welding current or voltage and producing, based on said welding current or voltage, a current deviation signal representative of the deviation between positive and negative halves of the welding current; and
- a second ignition pulse forming circuit responsive to said synchronizing signal, said first ignition pulse and said current deviation signal for supplying to said second gate controlled rectifier a second ignition pulse.

4. A power supply apparatus for a resistance welder according to claim 3, wherein said second ignition pulse forming circuit comprises:
- a pulse generator connected to receive said synchronizing signal and producing a pulse at the time said synchronizing signal rises;
- a first counter connected to receive a predetermined clock pulse for counting up the same and being reset at the trailing edge of said pulses from said pulse generator;
- a signal converter connected to receive said current deviation signal and converting the same for producing therefrom a correction signal; and
- a second counter being set with the sum of an accumulated count in said first counter and the correction signal at the leading edge of said pulse from said pulse generator for counting down the set count with the predetermined clock pulse each time it receives said first ignition pulse to produce said second ignition pulse when its count falls to zero.

5. A power supply apparatus for a resistance welder comprising:
- first and second gate controlled rectifiers connected in inverse-parallel relationship and inserted between an AC power source and a transformer, for supplying, during a predetermined time interval, a welding current from the AC power source to a pair of welding electrodes via the transformer; a synchronizing signal generating circuit for generating a synchronizing signal based on the voltage wave form of said AC power source;
- a first ignition pulse forming dircuit responsive to said synchronizing signal and a setting level, for supplying a first ignition pulse to said first gate controlled rectifier when said synchronizing signal reaches said setting level;
- a current deviation sensor circuit responsive to the welding current or voltage and producing, based on said welding current or voltage, a current deviation signal representative of the deviation between positive and negative halves of the welding current;
- a controlling angle command circuit for selectively delivering a controlling angle command signal in accordance with the phase difference between said synchronizing signal and said first ignition pulse; and
- a second ignition pulse forming circuit responsive to said synchronizing signal, said first ignition pulse, said current deviation signal and said controlling angle command signal, for supplying to said second gate controlled rectifier a second ignition pulse.

6. A power supply apparatus for a resistance welder according to claim 5, wherein said second ignition pulse forming circuit comprises:
- a pulse generator connected to receive said synchronizing signal and producing a pulse at the time said synchronizing pulse rises;
- a first counter connected to receive a predetermined clock pulse for counting up the same and being reset at the trailing edge of said pulse from said pulse generator;
- a signal converter connected to receive said current deviation signal and said controlling angle command signal and converting the same for producing therefrom a correction signal; and
- a second counter being set with the sum of an accumulated count in said first counter and the correction signal at the leading edge of said pulse from said pulse generator for counting down the set count with a predetermined clock pulse each time it receives said first ignition pulse to produce said second ignition pulse when its count falls to zero.

7. A power supply apparatus according to claims 1, 2, 3, 4, 5 or 6, which further comprises:
- a sensor for picking up the welding current;
- a calculator for computing the effective value of said sensed current over predetermined cycles; and
- a setting value changing circuit for changing, based on said effective value, the level of the output signal from said current setting circuit.

* * * * *